US011639022B2

(12) United States Patent
Reszewicz et al.

(10) Patent No.: US 11,639,022 B2
(45) Date of Patent: May 2, 2023

(54) DUCT MANUFACTURING METHOD

(71) Applicant: Hamilton Sundstrand Corporation, Charlotte, NC (US)

(72) Inventors: Modest Reszewicz, Wroclaw (PL); Tomasz Serafinowicz, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 986 days.

(21) Appl. No.: 16/386,419

(22) Filed: Apr. 17, 2019

(65) Prior Publication Data
US 2019/0337221 A1 Nov. 7, 2019

(30) Foreign Application Priority Data

May 1, 2018 (EP) .................... 18461555

(51) Int. Cl.
| | | |
|---|---|---|
| *B29C 64/118* | (2017.01) | |
| *B33Y 70/00* | (2020.01) | |
| *B29C 64/209* | (2017.01) | |
| *B29C 64/268* | (2017.01) | |
| *B33Y 10/00* | (2015.01) | |
| *B33Y 30/00* | (2015.01) | |
| *B33Y 80/00* | (2015.01) | |
| *B29L 23/00* | (2006.01) | |

(52) U.S. Cl.
CPC .......... *B29C 64/118* (2017.08); *B29C 64/209* (2017.08); *B29C 64/268* (2017.08); *B33Y 70/00* (2014.12); *B29L 2023/22* (2013.01); *B33Y 10/00* (2014.12); *B33Y 30/00* (2014.12); *B33Y 80/00* (2014.12)

(58) Field of Classification Search
None
See application file for complete search history.

(56) References Cited

U.S. PATENT DOCUMENTS 5,121,329 A * 6/1992 Crump .................... G06F 15/46
364/468
2015/0321418 A1* 11/2015 Sterman et al. ........ B29C 67/00
(Continued)

FOREIGN PATENT DOCUMENTS

| EP | 0111057 A1 | 6/1984 | |
|---|---|---|---|
| EP | 0496181 A1 | 7/1992 | |
| EP | 3067186 A1 * | 9/2016 | ............. B29C 67/00 |

(Continued)

OTHER PUBLICATIONS

Machine translation of KR 20170139080 A performed on Sep. 12, 2022, Abeshaus et al. (Year: 2017).*

(Continued)

*Primary Examiner* — Brian W Jennison
*Assistant Examiner* — Kevin Guanhua Wen
(74) *Attorney, Agent, or Firm* — Cantor Colburn LLP

(57) ABSTRACT

A method and apparatus, for manufacturing a duct for a fluid management system of an aircraft. A filament-fed additive manufacturing apparatus is used to perform the additive manufacturing process. The additive manufacturing apparatus comprises a nozzle, wherein the nozzle receives material in the form of a filament and adds said material to the duct in a location proximate to the nozzle location, and wherein the nozzle moves in a generally helical path relative to the duct.

14 Claims, 3 Drawing Sheets

(56) References Cited

U.S. PATENT DOCUMENTS

2016/0151833 A1\* 6/2016 Tsao ................... B22D 23/00
2018/0010237 A1\* 1/2018 Forseth et al. .......... C23C 14/24

FOREIGN PATENT DOCUMENTS

| EP | 3290766 A1 | | 3/2018 | | |
|----|------------|---|--------|---|---|
| JP | 2015534006 A | \* | 11/2015 | .............. | F16L 9/128 |
| KR | 20170139080 A | \* | 12/2017 | ............ | B33Y 10/00 |
| WO | WO 2018005106 A1 | \* | 1/2018 | ................ | F02C 7/22 |

OTHER PUBLICATIONS

Machine translation of JP 2015534006 A performed on Sep. 12, 2022, Hammer et al. (Year: 2015).\*

Extended European Search Report for International Application No. 18461555.7 dated Nov. 6, 2018, 7 pages.

\* cited by examiner

DUCT MANUFACTURING METHOD

FOREIGN PRIORITY

This application claims priority to European Patent Application No. 18461555.7 filed May 1, 2018, the entire contents of which is incorporated herein by reference.

BACKGROUND

The present disclosure relates a method for manufacturing a duct for a fluid management system in an aircraft, e.g., a duct for the transportation of gases within an aircraft, and an apparatus capable of performing such a method.

Ducts are used to transport gases in aircrafts for various purposes.

One such purpose is for the transportation of air in the air management system for the cabin of an aircraft. An air management system for a cabin may ensure that the cabin air is of a desired temperature and pressure.

Another such purpose is in an inerting system. An inerting system is a system that keeps combustible gases out of contact with the liquid fuel in the fuel tank of an aircraft. This typically comprises providing a supply of an inert gas (such as nitrogen) in the fuel system to ensure that any spaces not filled with liquid fuel are filled with the inert gas.

Ducts may be used to transfer gas between the various components of the system (such as heat exchangers and compressors), and may also house various components of the system.

Ducts are typically made out of a metallic material (such as stainless steel or aluminium). In prior art methods, typically ducts have been made by folding a flat sheet of metal to form a tube shape. The tube shape may be generally straight and may have a generally rectangular cross-section, or may have a more rounded cross-section (such as a circle). If it is desired for a bend to be present in the duct, the tube may be bent to provide the desired bend. This bending process typically comprises bending the tube when it is cold and then heat treating the bent tube to set the bend in the tube.

The present disclosure provides an improved way of manufacturing a duct.

SUMMARY OF THE DISCLOSURE

Disclosed herein is a method of manufacturing a duct for a fluid management system in an aircraft. An additive manufacturing apparatus is used to perform the additive manufacturing process. Said additive manufacturing apparatus comprises a nozzle. The nozzle receives material in the form of a filament of said material, and adds said material to the duct in a location proximate to the nozzle location. The nozzle moves in a generally helical path relative to the duct.

The duct may be for use in a gas management system in an aircraft.

The duct may be a metallic duct. The material may be metallic. In this case, the filament may be a wire.

The duct may be a non-metallic duct. The material may be non-metallic. In this case, the filament may be a filament of said non-metallic material.

The duct may comprise a longitudinal direction. The duct may comprise a cross-section viewed in the longitudinal direction that changes with respect to the longitudinal direction. Said change in the cross-section may be produced by adjusting the helical path. For example, an X-Y position of the nozzle can be altered on each pass of the helical path so that a wall of the duct being built up through the filament-fed additive manufacturing process is caused to change shape over a longitudinal distance.

The duct may comprise a bend.

Said bend may be produced by selectively adjusting the speed of the nozzle relative to the duct such that the bend is produced. During such deposition, the filament may be fed from the nozzle at a constant rate.

Said bend may be produced by selectively adjusting the rate at which the nozzle adds material to the duct such that the bend is produced.

The additive manufacturing apparatus may comprise a plurality of nozzles that move in a generally helical path relative to the duct. Each nozzle may be fed with respective filaments of material. Respective nozzles may be selectively controlled such that the bend is produced. The plurality of nozzles may be arranged in series, such that one follows the next around the helical path. A plurality of nozzles may be arranged side-by-side to dispense material across a wider area. A plurality of nozzles may be arranged spaced apart but moving relative to the duct in a common way to build up a plurality of walls simultaneously during movement of the nozzles around respective helical paths.

The additive manufacturing apparatus may comprise a manipulator connected to the duct. The manipulator may be capable of moving the duct relative to the nozzle.

The manipulator may be capable of moving the duct in 2D or 3D relative to the nozzle.

Also disclosed herein is an additive manufacturing apparatus for manufacturing a duct. Said additive manufacturing apparatus may be capable of performing any of the methods discussed above.

The apparatus may comprise a laser or other source of heat to melt filament of material as it exits the nozzle (or nozzles).

The apparatus may comprise a source of gas to shield the melted filament material. This is particularly the case when the filament is a metal wire.

The apparatus may comprise a manipulator that is arranged to support the duct during the additive manufacturing process. The manipulator may be capable of moving the duct relative to the nozzle.

The manipulator may be capable of moving the duct in 2D or 3D relative to the nozzle.

The apparatus may be controllable such that a changing cross-section may be produced in the duct during the additive manufacturing process.

The apparatus may be controllable such that a bend may be produced in the duct during the additive manufacturing process.

The present disclosure also extends to a duct, for example, a duct for a fluid management system in an aircraft, which has been made by a filament-fed additive manufacturing process, for example, as described in any of the statements above.

BRIEF DESCRIPTION OF THE DRAWINGS

Certain embodiments of the disclosure will now be described by way of example only and with reference to the accompanying drawings in which.

DETAILED DESCRIPTION

Figure 1A:
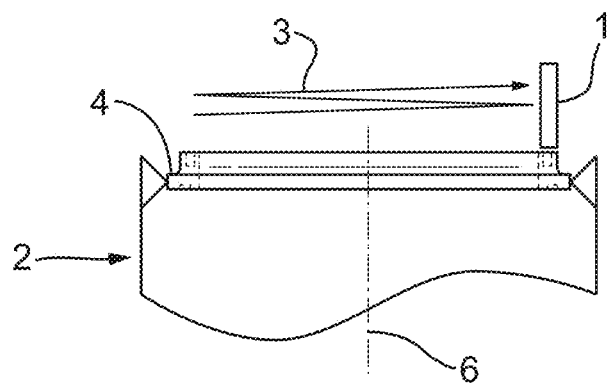
FIGS. 1a to 1e show a schematic view of a method of manufacturing a duct in accordance with an embodiment of the present disclosure.

As discussed above, the present method relates to a method of manufacturing a duct, particularly for the transportation of gas within an aircraft. The method comprises using a filament-fed additive manufacturing process to manufacture the duct. Said additive manufacturing apparatus comprises a nozzle. The nozzle receives material in the form of a filament of said material, and adds said material to the duct in a location proximate to the nozzle location. The nozzle moves in a generally helical path relative to the duct.

In comparison with the prior methods of manufacturing such ducts described above, the present method allows for the duct to be made more quickly and more efficiently, particularly when the ducts comprise a bend. This may be of particular use when prototyping new ducts. Due to the flexibility of the additive manufacturing process (which is described in more detail below), the present method does not require an initially straight tube to be bent and then heat treated in order to produce a duct with a bend in it.

Further, the prior method of producing bends meant that the form of the bends (e.g. the complexity, curvature and spacing) of bends was greatly restricted. Further still, using the prior method, it is difficult to produce a duct that has a varying cross section. In comparison, the present method is capable of producing a duct with a larger range of possible shapes, including ducts which have a variable wall thickness. Hence, with the present method, it is possible to produce ducts that can extend through and use spaces that would not have been useable by ducts produced by prior methods. For instance, the ducts can extend through more compact, more complex spaces, which in turn can save weight and space for the fluid management system as whole (e.g. the air management system inside an aircraft). It is also possible to adjust their properties over their length (e.g., wall thickness) to achieve lighter weight ducts while meeting required structural properties.

Further, the cross sectional flow area of the duct through the bend can be made constant, and the walls of the duct may be made smooth. Bending of a typical duct often causes a reduction in flow area in the bend as well as buckling/wrinkling of the walls.

Further, using the present method, it is possible to produce ducts, particularly ducts of complex shapes, using less material than the prior art methods. This both saves cost of the material, and saves weight (which is particularly important in aircraft).

In the prior art, bending and shaping a duct required specific tools (such as bending tools, cutting tools and heat treating tools). These tools are complex and expensive. The present method does not require such tools.

Whilst additive manufacturing techniques (e.g. 3D printing techniques) are known to be used to manufacture complex 3D shapes, prior to the present method, such techniques have not been commonly used to manufacture ducts for transporting gases with an aircraft. One reason for this is that such ducts are typically made of metal. When it is desired to 3D print using a metallic material, the form of additive manufacturing is typically powder-based. However, it would be difficult and slow to manufacture a duct shape from a powder-based technique (as discussed below). Hence, 3D printing has not been used to manufacture metallic ducts for use in aircraft, prior to the present method.

Further, using a continuous helical path has not been used to manufacture ducts. Rather, fused filament fabrication methods, such as fused deposition modelling, build up an article layer-by-layer, in a step-wise, non-helical manner. Using a continuous helical path allows for improved material properties of the duct, due to the continuous nature of the addition of material. Further using a continuous helical path may reduce the time involved in the manufacturing.

The additive manufacturing technique used in the present method is a filament-fed additive manufacturing technique. In such a technique, a filament of material (such as a wire) is fed from a source of said filament material to the nozzle, where it is then heated and used to build up the article being printed. The additive manufacturing technique may be described as powderless.

A filament is an elongated and thin piece of material. Typically it may have a diameter much less than its length. It may be in the shape of a wire.

The duct may be a metallic duct. By way of example, the duct may be made of steel (such as stainless steel), a nickel or cobalt based superalloy, aluminium or titanium, or an alloy based on iron, nickel/cobalt, aluminium and/or titanium. In this case, the filament may be a metallic wire. The process may be termed a wire-feed 3D manufacturing process.

As has been mentioned above, typical additive manufacturing techniques for metals are performed by a powder-based technique, whereby a layer of powdered metal is placed on the piece being printed and then treated (e.g. by heat) to join the powdered metal to the piece. The piece is built up in a layer-by-layer fashion by performing these steps numerous times.

However, it would be very difficult to use such a powder-based technique for producing metallic ducts. One reason for this is because a supporting structure would be needed in order to support unsintered powder, particularly when a new layer is desired to be built onto a location where no previously-sintered layers exist (which may be the case for complexly-shaped ducts, such as curved ducts, or ducts where the cross-section changes). Such supporting structures would be costly to build and would require more material than the duct itself. Further, they would greatly reduce the flexibility of the duct shapes possible, which is one of the advantages of the present method over the prior art. Further still, the supporting structure would need to be removed after construction of the duct, which would add further time and costs onto the manufacturing method.

Wire-feed additive manufacturing is a much newer form of additive manufacturing that the inventors have discovered could be useful for manufacturing ducts, particularly metallic ducts for aircraft.

Alternatively the duct may be a non-metallic duct. The duct may be made of a polymer material. One non-limiting example is polyphenylene sulphide. In this case, the filament may be a filament of said non-metallic material.

The term "duct" is used herein to describe any tube or hollow shaft structure that is used to transport fluids (preferably gases) through an aircraft. A duct may connect the various components of a gas management system (e.g. an inerting system or an air management system) to each other. Further the duct may also house one or more components (e.g. the duct may provide the housing for one or more components) such that the components are placed/constructed/held within the duct itself. Such components comprise compressor(s), heat exchanger(s), pump(s), fan(s), tank(s), filter(s), etc.

The duct is for use in a fluid management system in an aircraft, e.g. a gas management system. Such a gas management system may be an inerting system (where it transports an inert gas, such as (pure) nitrogen) or an air management system for a cabin of the aircraft (where it transports air (e.g. primarily oxygen and nitrogen)). The duct may allow one or more fluids (e.g. gases) to pass through the duct and hence move around the fluid management system.

An additive manufacturing technique may also be referred to as a 3D printing technique.

The additive manufacturing technique may be used to produce a part of the duct, most of the duct, substantially all of the duct, or all of the duct. In the case that the additive manufacturing technique does not produce all of the duct, there may be another part of the duct that has not been made by the present additive manufacturing method. For instance, the part made by additive manufacturing may be attached to the other part, or may be built/printed directly onto the other part. This other part may be the end piece discussed below.

The other part may be substantially planar (or may comprise a plane onto which the duct is to be printed) and said plane may be substantially perpendicular to the central longitudinal axis of the duct that is to be printed on the other part. In order to start the helical path, the first layer (or a plurality of initial layers) of the helical path may have a varying thickness. The varying thickness may be such that the pitch of the helical path is formed. The varying thickness may be produced by controlling the speed of the nozzle(s) and/or controlling the rate at which the nozzle(s) add material and/or controlling the number of nozzles being used.

Additionally/alternatively, the other part may be substantially planar (or may comprise a plane onto which the duct is to be printed) and said plane may not be perpendicular to the central longitudinal axis of the duct that is to be printed on the other part. In this case, the normal to the plane of the duct may not be parallel with the longitudinal axis. The angular difference between the normal to the plane of the duct and the longitudinal axis may (at least partially) define the pitch of the helical path. The thickness of the initial layer(s) may be constant, but they may also be varied as mentioned above.

The plane onto which the duct may be printed may be a solid continuous surface, or may not be a solid continuous surface (for example, it may comprise an opening, e.g. it may be an annulus or the like).

The present method is specifically for producing ducts intended to be used in aircraft. Such ducts are of a specific type, and the skilled person would be aware of regulations that govern the quality and form of such ducts. The skilled person would be aware of whether any given duct was able to be used in an aircraft.

An additive manufacturing apparatus is used to perform the additive manufacturing process. Such an apparatus is described in more detail below. An additive manufacturing apparatus is any apparatus capable of additive manufacturing, particularly an apparatus that is capable of performing the methods discussed herein.

Said additive manufacturing apparatus comprises a nozzle that receives material in the form of a filament, and adds said material to the duct in a location proximate to the nozzle location. The filament may be fed through the nozzle. The nozzle may be able to heat the filament as it is fed through (or after it is fed through), thus joining (or fusing) the filament material to the piece being manufactured. The material of the filament may be the same as the material of the duct, i.e. the filament may be the only source of material for the duct. In a filament-fed system, the heat that melts the filament may be produced by an energy source. The energy source may be as one or more lasers (or one or more electron beams), particularly when the filament is a metallic wire. The energy source may be located in the nozzle (or near the nozzle). The energy source (such as the laser(s) or electron beam(s)) may direct energy onto the end of the filament thus causing the filament to melt. If this occurs proximate to the previous layer of the duct, the duct can be built-up (i.e. "printed"). Alternatively, or additionally, heat may be supplied by a heating element in the nozzle, e.g., through conduction or induction.

There may be only one nozzle. However, there may be more than one nozzle. Using multiple nozzles may speed up the process, or allow more flexibility in the process (e.g. to help curved duct sections to be produced, as discussed below, or to provide regions of increased wall thickness or more complicated wall geometry, or to provide regions of increased wall thickness or more complicated wall geometry).

The nozzle moves in a generally helical path relative to the duct being produced. This generally helical path may be such that, as the nozzle moves around the perimeter of the duct and adds material to the existing duct material, the nozzle not only moves around the central longitudinal axis of the duct in an azimuthal direction, but it also moves in the direction of the central longitudinal axis of the duct. This is shown in FIGS. 1a to 1e, as discussed below. The nozzle may move substantially continuously (but possibly at varying speeds) in the longitudinal direction and in the azimuthal direction. This differs from a "layer-by-layer" approach (such as FDM), where the nozzle does not move continuously in the longitudinal direction, but rather moves step-wise.

By "helical path", it is meant that the path travelled by the nozzle resembles a helix, but may not necessarily be a perfect helix. For instance, the path may or may not have a circular cross-section (when viewed along the central longitudinal axis of the duct); rather, the cross-section can be any shape, such as oval, rectangular, etc. Further, the pitch of the helical path may change.

Such an additive manufacturing process allows the shape of the duct to be selected, controlled and varied as desired. This means bespoke parts can be produced more quickly and cheaply than before. In the past, the use of bespoke parts for a particular system has been difficult due to the limitations of the past duct manufacturing methods (discussed above). This in turn has placed limitations on the systems using the ducts.

The dimensions of the helix (e.g. the cross-sectional shape of the helix) can change as the duct is produced, thus producing a duct that has a correspondingly-varying cross-section. This allows for much flexibility in the shape and/or properties of the duct being manufactured. Such a variation of cross-section of a duct was very difficult using previous methods of manufacture.

The generally helical path of the nozzle may be produced by moving the nozzle relative to the duct being printed. This may be achieved by moving the nozzle relative to a stationary duct, or moving the duct relative to a stationary nozzle, or by moving both the nozzle and the duct.

As has been mentioned above, it may be desirable for the duct to comprise a bend. There may be a desire for a plurality of bends. The bends may be in the same or in different directions. The bends may have the same or different curvatures. The bend (or at least one of the bends, when plurality of bends are present) may comprise a complex curvature. Such bend(s) may be produced in several ways, as set out below.

The bend may be produced by selectively adjusting the speed of the nozzle relative to the duct. This may produce the bend since if a nozzle moves at a slower rate relative to the duct, then more material may be added to the duct. It may be necessary for more material to be added at the outside of a bend than at the inside of a bend. By adjusting the speed of the nozzle relative to the duct, as the nozzle moves in the generally helical path relative to the duct, the bend may be formed. Generally, the nozzle will move slower at the outside of the bend than at the inside of the bend.

Additionally/alternatively, the bend may be produced by selectively adjusting the rate at which the nozzle adds material to the duct. The rate at which material is fed to the nozzle and at which the material is bonded to the duct may be adjustable. For instance, in a filament-fed system, the rate at which the filament is fed to the nozzle may be adjustable. This may produce the bend since if the rate at which the nozzle can adhere material to the duct increases, then more material may be added to the duct. It may be necessary for more material to be added at the outside of a bend than at the inside of a bend. Thus, by adjusting the rate, as the nozzle moves in the generally helical path relative to the duct, the bend may be formed. Generally, the nozzle may add material at a higher rate at the outside of the bend than at the inside of the bend. This rate-changing of the nozzle may be used with or without adjusting the speed of motion of the nozzle relative to the duct.

Additionally/alternatively, the additive manufacturing apparatus may comprise a plurality of nozzles that move in a generally helical path relative to the duct. The plurality of nozzles may all move in the substantially the same helical path. They may all move together with one another relative to the duct. Just like for the single nozzle mentioned above, it may be the nozzles that move relative to a stationary duct, or the duct that moves relative to stationary nozzles, or both may move. Respective nozzles may be selectively controlled such that the bend is produced. This may produce the bend since if, for instance, more nozzles are used then more material may be added to the duct. It may be necessary for more material to be added at the outside of a bend than at the inside of a bend. By adjusting, for instance, the number of nozzles being used, as the nozzles move in the generally helical path relative to the duct, the bend may be formed. Generally, more nozzles will be used at the outside of the bend than at the inside of the bend. The nozzles may be controlled by switching them on/off and/or by adjusting their speeds of movement relative to the duct and/or by adjusting the rate at which they add material.

Using an additive manufacturing apparatus that is able to produce such a bend (such as those discussed above) is advantageous for many reasons. The smallest radius of curvature of the central longitudinal axis of a duct produced by known, typical methods was roughly equal to one diameter of the duct. Using the present method, the radius of curvature of the central longitudinal axis can be as low as half a diameter of the duct, or less. Thus, the present method allows for the manufacture of ducts with much tighter bends.

Further, multiple bends can easily be formed in the same, integral section of the duct. In the past, this was very difficult. Typically, there was only one bend per integral section, and if a more complex shape was required, multiple different sections would be need to be made separately and then joined together.

The additive manufacturing apparatus may comprise a manipulator connected to the duct, said manipulator being capable of moving the duct relative to the nozzle. The manipulator may be rigidly connected to the duct such that the duct moves with the manipulator.

The manipulator may be rigidly, but releasably, connected to the duct being manufactured (e.g. it may be attached to the duct, or to another piece that is rigidly attached to the duct). For instance, the manipulator may hold an end piece of the duct. The end piece may be a piece used to attach the duct to other components in the gas management system in the aircraft (such as another duct, or a heat exchanger, or a compressor, or a fan, etc.). The end piece may comprise a flange for doing so. The end piece may not be made during the present additive method, rather it may be provided beforehand as an already-constructed piece.

Alternatively, the duct may be built upon the manipulator (e.g. at the start of the additive manufacture process, the material of the duct may be added to the manipulator). At the end of the process, the duct may need to be cut free from the manipulator.

The manipulator may be capable of moving the duct in 2D or 3D relative to the nozzle. One of these dimensions may be a linear direction in the longitudinal direction of the duct. This longitudinal direction may be the longitudinal direction of the duct at the location at which material is being added (i.e. the direction that is generally perpendicular to the plane that is generally defined by the end of the duct that is adjacent to the nozzle). One of these directions may be the azimuthal direction about the longitudinal direction of the duct at the location at which material is being added (i.e. a rotation about the longitudinal direction). One of these dimensions may be the polar direction relative to the longitudinal direction of the duct (i.e. a rotation about an axis that is perpendicular to the longitudinal direction).

Also disclosed herein is an apparatus for manufacturing a duct for the transportation of gases within an aircraft. Said additive manufacturing apparatus may be capable of performing the methods discussed herein.

As has been mentioned above, such an apparatus comprises at least one nozzle, wherein the nozzle is configured to receive filament material and to add said material to the duct in a location proximate to the nozzle location, and wherein the nozzle is configured to move in a generally helical path relative to the duct. This has been discussed above.

The nozzle(s) may be controllable such that the shape of the duct may be varied. For instance, a bend may be produced, or a change in the cross-section may be produced. Again, this has been discussed above.

The apparatus may comprise a manipulator that is arranged to support the duct during the additive manufacturing process. Said manipulator may be capable of moving the duct relative to the nozzle. The manipulator may comprise a gripping device that has a head which grips the duct and is capable of moving in any direction. Its movement may be controlled by a computer. Again, this has been discussed above.

The additive manufacturing apparatus may comprise an input and a controller.

The input may be configured to receive an input from a user with the specifications of a desired duct. Additionally/alternatively, the input may be configured to receive an input from another system (e.g. a computer) with specifications of the desired duct. These specifications may include size, shape, length, material, thickness of material, etc. The user may be an operator of the apparatus (i.e. a human).

The controller may be configured to control the additive manufacturing apparatus, based on the input such that the desired duct is produced. The controller may comprise a processor programmed to process input specifications to output action instructions for the apparatus.

The apparatus may comprise an energy source, such as a laser device or an electron beam device, for melting filament material being dispensed from the nozzle.

The apparatus may comprise an inert gas supply and outlet manifold for directing inert gas over molten material which is being deposited to form the duct.

The apparatus may comprise a filament feed device, for example, a reel of filament and a feeding mechanism for feeding the filament through the nozzle at a controlled rate.

Also disclosed herein is a duct produced using any of the methods discussed herein. The duct may be for a fluid management system (such as a gas management system, e.g. an air management system or an inerting system). The duct may be for use in an aircraft.

Also disclosed herein is a fluid management system comprising a duct produced using any of the methods discussed herein. The fluid management system may be for use in an aircraft. The fluid management system may be a gas management system, e.g. an air management system or an inerting system.

Turning now to FIGS. 1a to 1e, shown is a schematic view of an embodiment of the present method.

FIG. 1a shows how an additive manufacturing apparatus comprises a nozzle 1 and a manipulator 2. As has been discussed above, the nozzle 1 and the manipulator 2 are arranged such that the nozzle 1 and the manipulator 2 can move relative to each other in a generally helical path 3 during the manufacturing process. The manipulator 2 holds an end piece 4 of the duct 5. The end piece 4 may be a piece used to attach the duct to other components (such as another duct, or a heat exchanger, or a compressor, or a fan, etc.). The end piece 4 is not made during the present additive method, rather it is provided beforehand as an already-constructed piece.

The helical path 3 is defined around a central longitudinal axis 6 of the duct 5. The central longitudinal axis 6 may be a straight line, or may curve as the duct curves (as can be seen from FIGS. 1c and 1d). The generally helical path 3 comprises a displacement of the nozzle 1 relative to the manipulator 2 in both the longitudinal direction and the azimuthal direction (i.e. the azimuthal angle around the longitudinal axis).

Whilst the duct 5 shown in the Figures is of a relatively simple form, it is possible for the duct 5 to have a more complex shape. For instance, the duct may have a double wall, instead of the single wall shown in the Figures. Further, the duct may exhibit a highly-complex shape, such as figure-of-8 dual duct structure. Such complex shapes are made possible through the present method.

As shown in FIG. 1a, the additive manufacturing process 4 begins by adding material directly to the end piece 4. This is achieved by feeding material to the nozzle 1 whilst moving the nozzle 1 and the manipulator 2 relative to one another in the generally helical path 3.

Figure 1B:
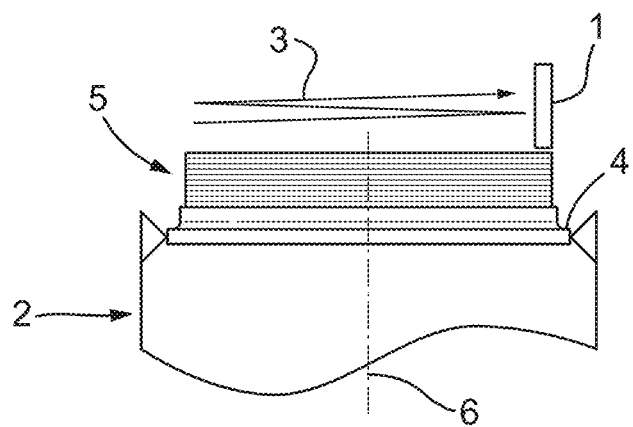

FIG. 1b shows the duct 5 beginning to be formed after a number of rotations of the nozzle 1. The manipulator 2 and the nozzle 5 have moved away from each other in the longitudinal direction of the duct 5, which may have been achieved by moving the manipulator 2 and/or the nozzle 1.

Figure 1C:
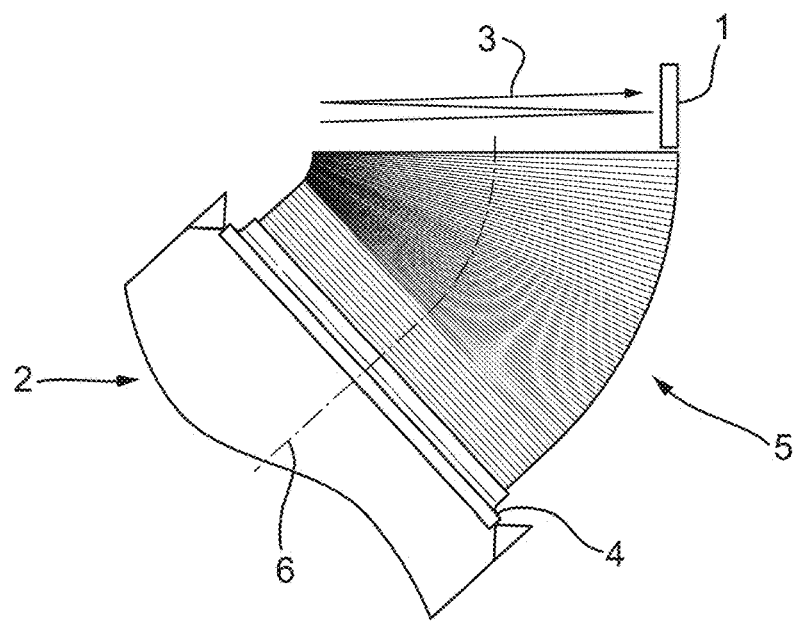

FIG. 1c shows further progress of the additive method. Here, a bend has been formed in the duct 5. This has been achieved by rotating the manipulator 2 relative to the nozzle 1 during the additive manufacturing. This rotation is about an axis that is perpendicular to the longitudinal axis (i.e. coming out of the page in FIG. 1c). This rotation may be considered to be a polar rotation. As has been discussed above, as the manipulator 2 and the nozzle 1 rotate relative to each other to form the bend, the nozzle 1 is controlled to add more material on the outside of the bend than on the inside of the bend. This control may be varying the rate at which material is added, the speed of the nozzle 1 relative to the duct 5, and/or the switching on/off of other nozzles that may be present.

Figure 1D:
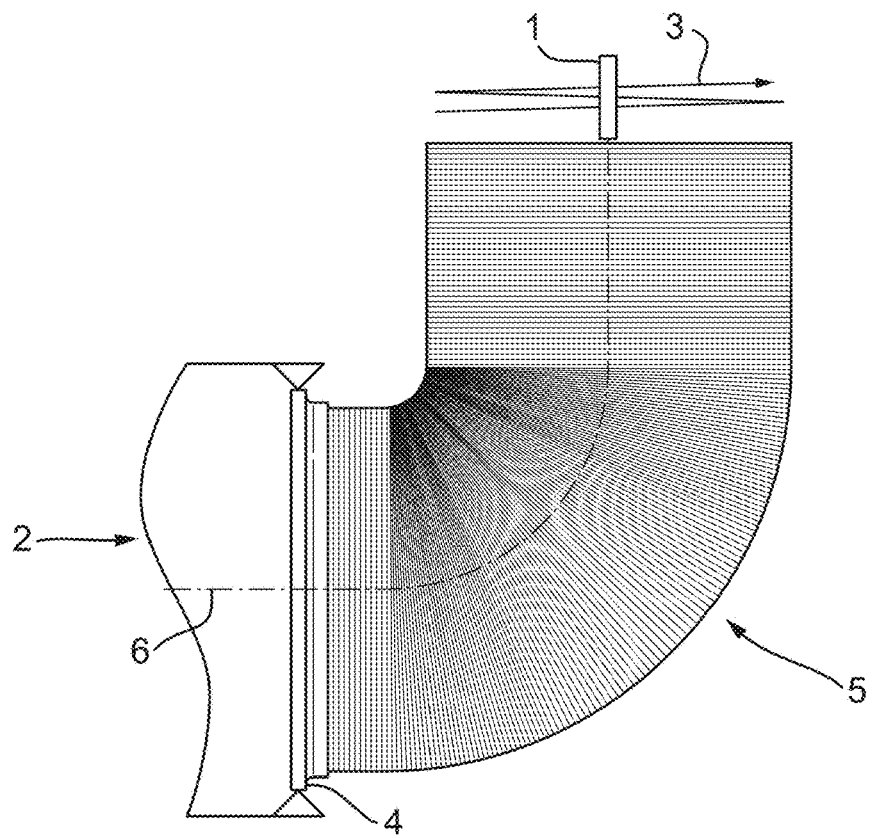

FIG. 1d shows the duct 5 with a completed 90° bend. The additive process can continue to finish the duct 5. The finished duct 5 may comprise multiple different bends, possibly in different directions and of different angular displacements. Further, the cross-section of the duct 5 (when viewed along the longitudinal axis 6) may vary in shape and/or in size, as has been discussed above.

FIGS. 1c and 1d show how the central longitudinal axis may bend. The radius of curvature of the central longitudinal axis can be significantly smaller than for prior duct manufacturing methods (as discussed above).

Figure 1E:
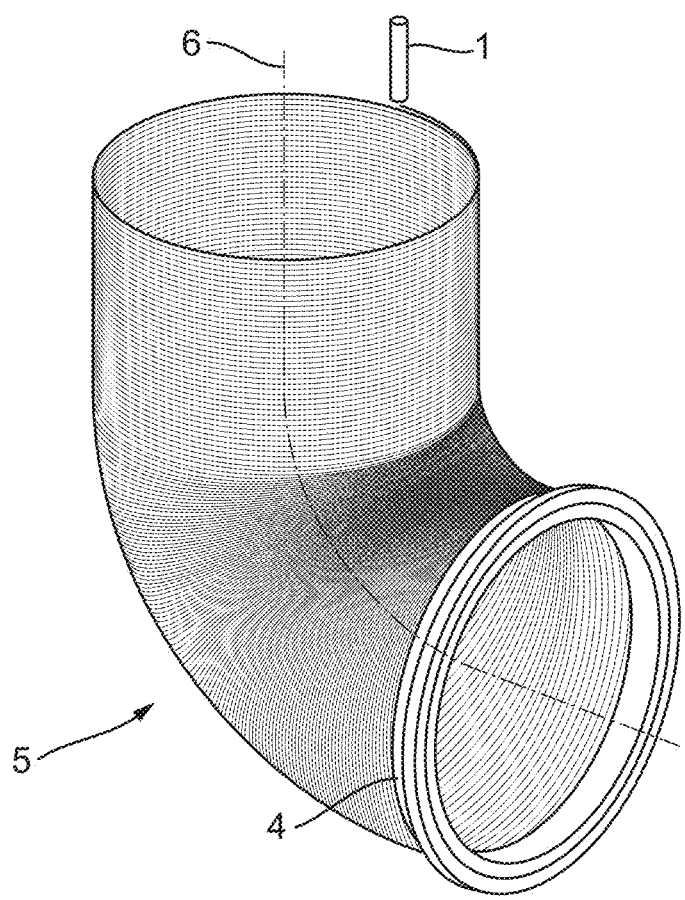

FIG. 1e shows a perspective view of the duct 5 shown in FIG. 1d. As can be seen, in this case the cross-section is circular.

Figure 2:
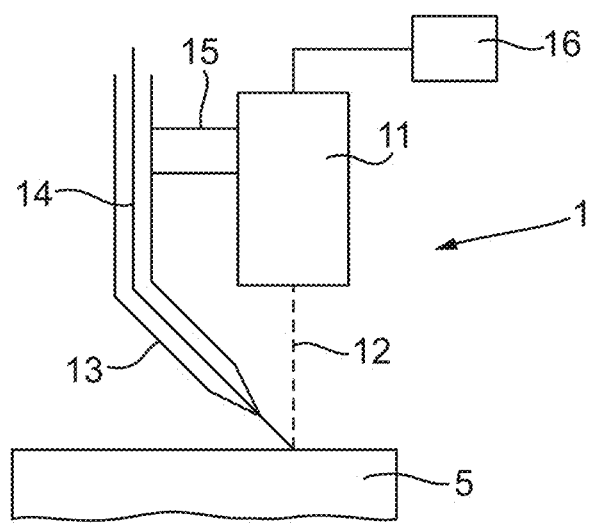
FIG. 2 shows an example of a nozzle for use in the present method.

Regarding FIG. 2, shown is a schematic view of an exemplary nozzle 1 for use in the present method. The nozzle 1 comprises an energy source 11, such as an electron beam source or a laser source. The nozzle 1 also comprises a wire guide 13 for guiding the wire 14 into the desired position. The energy source 11 directs energy 12 (such as an electron beam or a laser beam) onto the wire 14 outside of the wire guide 13. The wire 14 may be provided from a source of the wire 14 (not shown).

The wire guide 13 and the energy source 11 remain stationary relative to one another even if the nozzle 1 is moved. This may be achieved by rigidly attaching the energy source 11 to the wire guide 13, such as by a bracket 15, or by any other suitable means.

The nozzle 1 is controlled by a controller 16. The controller 16 may receive inputs from a user or from a computer. The controller 16 may control the position of the nozzle 1, the rate at which the wire 14 is fed through the nozzle and the amount of energy produced from the energy source 11. The nozzle 1 may comprise a means for moving the nozzle 1, such as an arm, which is not shown, which may be controlled by the controller 16.

The invention claimed is:

1. A method of manufacturing a duct for a fluid management system of an aircraft using a filament-fed apparatus additive manufacturing apparatus, the method comprising:
   adding the material received by the nozzle to an initial layer of the duct in a location proximate to the nozzle, wherein the nozzle moves in a generally helical path relative to the duct while adding the material to the initial layer, wherein when moving in the generally helical path the nozzle continuously moves in the direction of the central longitudinal axis of the duct and around the central longitudinal axis of the duct in an azimuthal direction such that the generally helical path comprises a pitch, wherein the thickness of material added to the initial layer increases such that at least some of the pitch of the generally helical path is formed by the increasing thickness of the initial layer; and
   adding the material received by the nozzle to the duct in a location proximate to the nozzle, wherein the nozzle moves in the generally helical path relative to the duct while adding the material to the duct;

wherein the duct comprises a bend and as such the central longitudinal axis of the duct comprises a radius of curvature commensurate with the bend, and wherein said bend is produced by selectively adjusting the speed of the nozzle relative to the duct such that the bend is produced.

2. The method as claimed in claim 1, wherein the duct is a metallic duct, the filament is a metallic wire, and the additive manufacturing apparatus is a wire-feed additive manufacturing apparatus.

3. The method as claimed in claim 1, wherein the duct comprises a cross-section viewed in the central longitudinal direction that changes with respect to the central longitudinal direction, and wherein said change in the cross-section is produced by adjusting the helical path.

4. A method of manufacturing a duct for a fluid management system of an aircraft using a filament-fed apparatus additive manufacturing apparatus, the method comprising:

adding the material received by the nozzle to an initial layer of the duct in a location proximate to the nozzle, wherein the nozzle moves in a generally helical path relative to the duct while adding the material to the initial layer, wherein when moving in the generally helical path the nozzle continuously moves in the direction of the central longitudinal axis of the duct and around the central longitudinal axis of the duct in an azimuthal direction such that the generally helical path comprises a pitch, wherein the thickness of material added to the initial layer increases such that at least some of the pitch of the generally helical path is formed by the increasing thickness of the initial layer; and adding the material received by the nozzle to the duct in a location proximate to the nozzle, wherein the nozzle moves in the generally helical path relative to the duct while adding the material to the duct;

wherein the duct comprises a bend and as such the central longitudinal axis of the duct comprises a radius of curvature commensurate with the bend, wherein said bend is produced by selectively adjusting the rate at which the nozzle adds material to the duct such that the bend is produced.

5. The method as claimed in claim 1, wherein the duct comprises a bend, wherein the additive manufacturing apparatus comprises a plurality of nozzles that move in a generally helical path relative to the duct, wherein each nozzle receives material in the form a filament, and wherein respective nozzles are selectively controlled such that the bend is produced.

6. The method as claimed in claim 1, wherein said additive manufacturing apparatus comprises a manipulator connected to the duct, said manipulator being capable of moving the duct relative to the nozzle.

7. The method as claimed in claim 6, wherein the manipulator is capable of moving the duct in 2D or 3D relative to the nozzle.

8. An additive manufacturing apparatus for manufacturing a duct, wherein said additive manufacturing apparatus is arranged and configured to perform the method of claim 1.

9. The additive manufacturing apparatus as claimed in claim 8, comprising a nozzle, wherein the nozzle is configured to receive material in the form of a filament and add said material to the duct in the location proximate to the nozzle location, and wherein the nozzle is configured to move in a generally helical path relative to the duct.

10. The additive manufacturing apparatus as claimed in claim 9, further comprising:

a manipulator that is arranged to support the duct during the additive manufacturing process, said manipulator being capable of moving the duct relative to the nozzle.

11. The additive manufacturing apparatus as claimed in claim 10, wherein the manipulator is capable of moving the duct in 2D or 3D relative to the nozzle.

12. The additive manufacturing apparatus as claimed in claim 8, wherein the apparatus is controllable such that a changing cross-section may be produced in the duct during the additive manufacturing process.

13. The additive manufacturing apparatus as claimed in claim 8, wherein the apparatus is controllable such that a bend may be produced in the duct during the additive manufacturing process.

14. The additive manufacturing apparatus as claimed in claim 8, further comprising a plurality of nozzles that are controllable so as to vary the thickness of layers of the helical path being printed.

* * * * *